US005360070A

United States Patent [19]

Milton

[11] Patent Number: 5,360,070

[45] Date of Patent: Nov. 1, 1994

[54] MOUNTING BRACKET FOR IMPLEMENT GUIDE SYSTEM

[75] Inventor: Duane R. Milton, Spencer, Iowa

[73] Assignee: Timothy J. Fairchild, Terril, Iowa

[21] Appl. No.: 93,462

[22] Filed: Jul. 19, 1993

Related U.S. Application Data

[63] Continuation-in-part of Ser. No. 894,571, Jun. 5, 1992, abandoned.

[51] Int. Cl.[5] .......... A01B 63/32

[52] U.S. Cl. .......... 172/6; 172/677; 180/131

[58] Field of Search .......... 172/5, 6, 677, 272, 172/439, 443, 26; 171/9; 104/244.1; 180/131, 79; 280/776

[56] References Cited

U.S. PATENT DOCUMENTS

| | | | |
|---|---|---|---|
| 3,326,319 | 6/1967 | Schmidt | 172/6 |
| 4,607,716 | 8/1993 | Beck | 180/131 |
| 5,025,866 | 6/1991 | Schmidt et al. | 172/5 |
| 5,029,650 | 7/1991 | Smit | 172/5 |
| 5,094,300 | 3/1992 | Jurgena | 172/5 |
| 5,255,756 | 10/1993 | Follmer et al. | 172/6 |

OTHER PUBLICATIONS

Farm Journal, "Adaptor Hitch" article, Mid-Mar. 1990, p. 24.

Farm Journal, "Guidance Systems Go to Work" article, Mar. 1990, pp. 38-39.

"Scout" Sales Brochure, Fleischer Mfg., Inc.

*Primary Examiner*—Randolph A. Reese
*Assistant Examiner*—Spencer Warnick

[57] ABSTRACT

An adaptor to allow a farm implement guide system to be used with a pull-type implement to keep a row-crop planter or cultivator properly in the desired row even though the pulling tractor becomes somewhat misaligned. The adaptor is inserted between the tongue of the implement which normally is elongated to allow clearance for tractor wheels when the implement is turned sharply and the machine itself so that relatively large misalignment may be corrected. The distance between the implement and the adaptor is kept as short as possible.

4 Claims, 3 Drawing Sheets

MOUNTING BRACKET FOR IMPLEMENT GUIDE SYSTEM

This application is a continuation in part of my previous application, Ser. No. 07/894,571 filed Jun. 5, 1992, now abandoned, and pertains to guidance systems for row-crop implements and more particularly to a device designed to be used with pull-type implements which will cause such an implement to follow a predesignated row for the planting or cultivating of row-crops.

BACKGROUND AND SUMMARY OF THE INVENTION

Crops such as corn, cotton, soybeans and the like are planted in rows, at least partly to make the elimination of weeds and the harvesting easier. In general, the rows should be parallel and without sharp deviation in curvature.

Formerly, planting and cultivating was done with relatively small implements so that following the rows and staying parallel was relatively easy. Two rows or four rows were planted or cultivated by a single implement, and markers were easy to follow. End rows were narrow because the equipment could turn in a relative short radius.

However, with the advent of larger tractors and implements that plant and cultivate eight to sixteen or twenty-four rows in a single pass, the problems becomes apparent. That is particularly true of an implement having a longer tongue and being pulled by a tractor. Such implements extend a substantial distance behind the tractor so that the implement does not precisely track the tractor particularly on sharper turns. Similarly, where planting and harvesting were done by equipment covering different numbers of rows, there is an increasing need for relatively exact following of the rows by the implement.

With a mounted implement beneath or in front of the tractor, there is little or no problem. For an implement attached to a three-point hitch at the rear of the tractor, there are now mechanisms to follow a track—usually a grove—in the ground and which will then slightly adjust the track of the implement.

With the present invention, a similar device combined with the implement tongue provides for the adjustment of the track of a pulled implement. The mechanism which adjusts the track adequate for the implement on a three joint hitch must, however, be coupled as close to the operating parts of the implement as possible so that the adjustment takes place at the implement and not at the end of the tongue. Adjustment to the tongue end is so remote from the operating parts as to be substantially ineffective for possibly even counter effective. By the present invention that discovery is put into practice.

DESCRIPTION

Briefly this invention comprises a combination of a device to modify the tracking of a pulled implement inserted in the tongue of such an implement by a unique bracket and supporting device to provide for adjusting the path of the implement to correspond to a marking groove.

Figure 1:
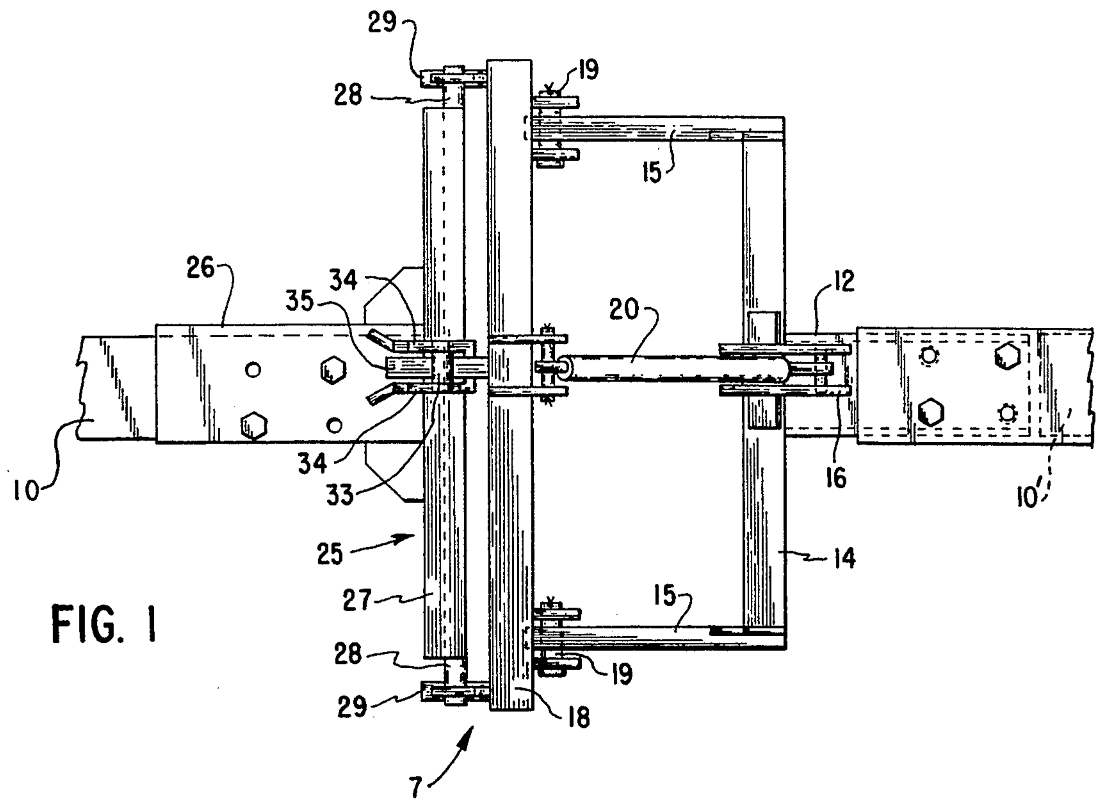
FIG. 1 is a top plan view of the device shown in place on the tongue of the implement.
Figure 2:
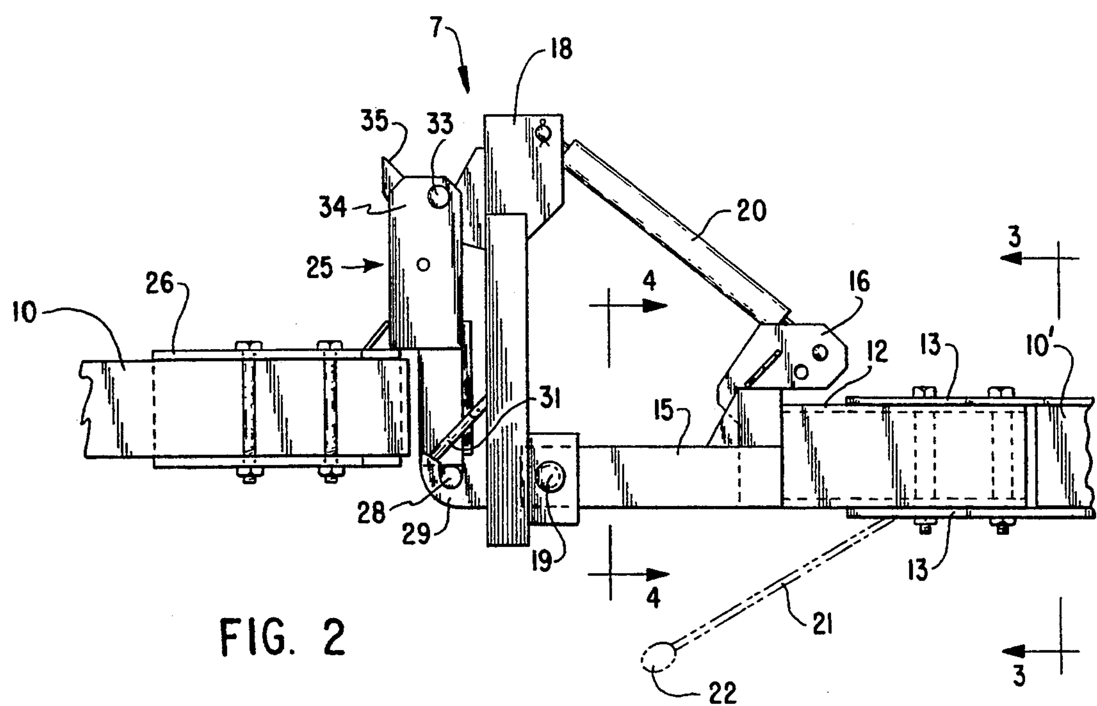
FIG. 2 is a side elevational view of the device of FIG. 1, FIG. 3 a view from line 3—3 of FIG. 2, showing the adaptor bracket.
Figure 3:
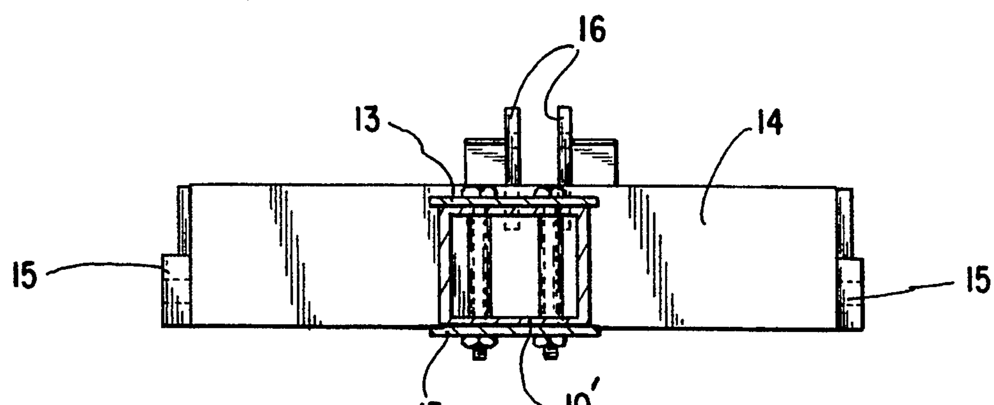
Figure 4:
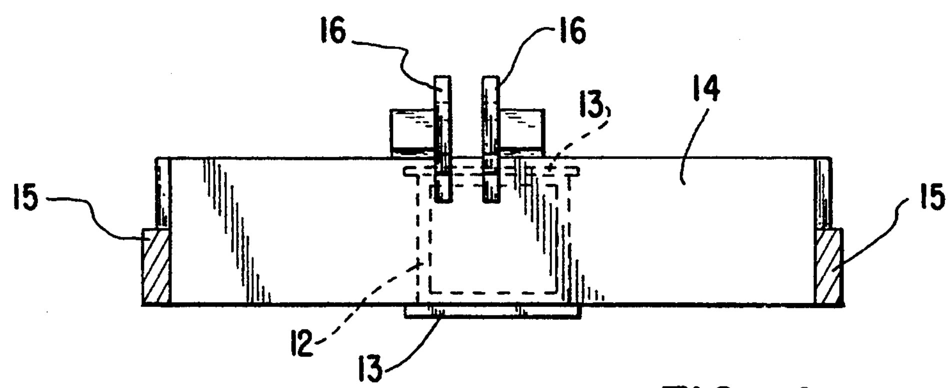
FIG. 4 is a view from line 4—4 of FIG. 2 also showing the adaptor.
Figure 5:
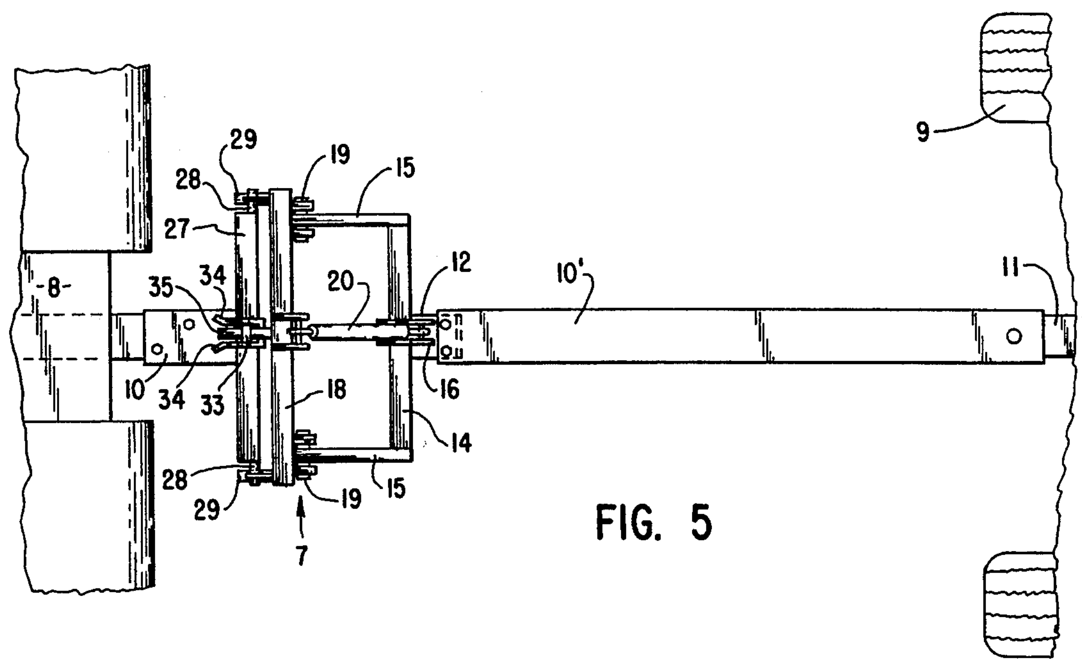
FIG. 5 is a top plan view of the device showing its placement relative to the tractor and the implement.
Figure 6:
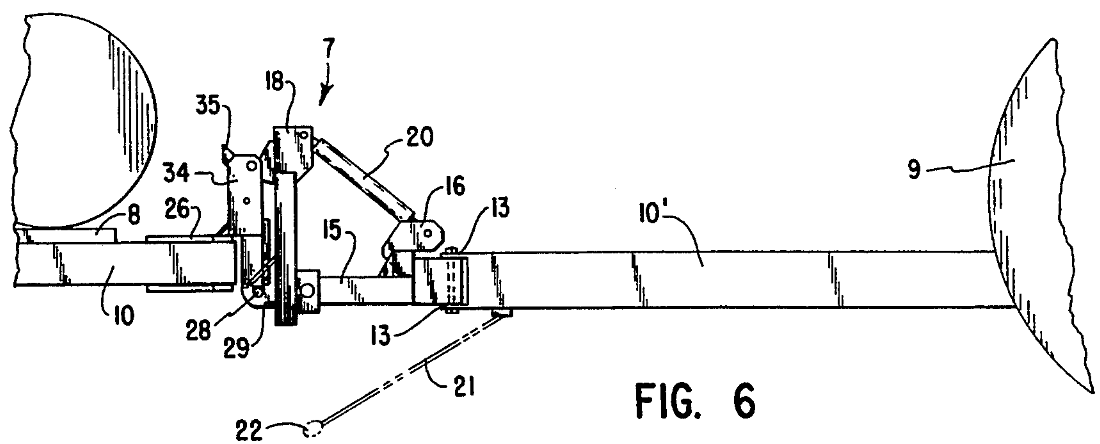
FIG. 6 is a view of the assembly of FIG. 5.

More specifically, and referring to the drawings, the adjusting assembly 7 is inserted between the pulling tongue 1O' which is pulled by the tractor 9 and the stub tongue 10 on the implement 8. The pulling tongue 10' is pivotally attached to the drawbar 11 on the tractor (FIG. 5). This is accomplished by cutting the tongue 10 close to the implement to provide for placement of the assembly in close proximity to the pulled implement.

Because it is essential to have the adjustment device and its bracket close to the implement, it may be necessary to cut the tongue 10 into two pieces, the short pulling tongue 10 and a much longer tongue segment 10'. The short pulling tongue should be very close to the implement and leaves preferably a space of a few inches to a foot but not more than fifteen inches between the frame of the implement 8 and the mounting of the assembly 7. A hitch similar in many respects to an ordinary three-point hitch is built on the tongue segment 10'. This hitch includes a bracket member having a mounting member 12 bolted or otherwise fastened to the pulling tongue 10'. It is illustrated as a square tube engaged between side plates 13 on the tongue, but it will be obvious that other shapes could be used. A cross member 14 extends laterally outward from the mounting member and at each end carries an arm 15. Above the arms 15 and erected on the mounting member 12 is a bifurcated bracket 16.

The adjusting and sensing device 18 is of the general type manufactured by the Fleisher Manufacturing Co., and sold under the trade name of Scout. This device is pivotally mounted on the arms 15 by means of pins 19. At its upper end, a hydraulic piston/cylinder assembly 20 holds the upper part of the adjusting device adjustable so that it may be tilted as desired. A sensor wand 21 is part of the adjusting device and is designed with a tip 22 to run in a groove in the soil such as may be formed by and outrigger guide bar common on such implements as planters. For best results, this wand 21 is mounted beneath the segment 10' with the tip 22 in proximity to the vertical, transverse plane of the adjusting device 18.

Attaching the stub tongue 10 to the adjusting device 18 is accomplished by an imitation of a normal three-point hitch attaching bracket. This imitation is formed as a separate adaptor means 25 having an extension 26 fastened to the stub tongue 10. A cross member 27 carries a bar 28 adapted to be hooked onto the lower hooks 29 of the adjusting means. Latches 30 on the lower hook hold the entire device to the implement so that the pulling tongue 10' will not come free from the implement simply by the dropping of the bar 28 out of the hooks 29.

A vertical member 32 of the adaptor means 25 extends upward and carries a short bar 33 between ears 34 on the vertical member. The bar 33 is engaged by the upper hook 35 on the adjusting device 18. Thus by engagement of the hooks 29 and 35, with the rod 28 and bar 33 respectively, the entire device is assembled. The adjusting device operates in this designed manner subject to impulses from the wand 21 so that even though the pulling tractor may run slightly off the desired track, the pulled implement will always be on the correct track as defined by the scribed groove in the soil.

I claim as my invention:

1. In combination with a pull-type farm implement adapted to be pulled by a pulling device, said pulling device having a drawbar with attachment means thereon; means for guiding said implement comprising a stub tongue on said implement, a pulling tongue substantially longer than said stub tongue for pulling said implement pivotally attached to said drawbar on said pulling device about a first pivot, a bracket fixed to said pulling tongue and an adjusting device attached to said bracket, said adjusting device including hooks extending therefrom opposite to said bracket, said adjusting device including a second pivot about which the position of said bracket may be adjusted, said pulling tongue being thereby pivotally adjustable, an attaching bracket on said stub tongue engageable with said hooks to releasably attach said adjusting device to the stub tongue on said implement.

2. The combination of claim 1 in which said adjusting device is tiltingly attached to said first named bracket near the bottom of said adjusting device, extendible means engaged between said bracket and the upper part of said adjusting device whereby said adjusting device can be tilted by extension of said extendible means.

3. The combination of claim 2 in which said first named bracket includes a mounting member fastened to said pulling tongue, a cross member extending laterally from said mounting member, arms on said cross member, pin means between said arms and said adjusting device to provide for tiltable mounting of said adjusting device, said first named bracket also including a bifurcated bracket, said bifurcated bracket providing the means to which said extendible means is fastened.

4. The combination of claim 1 in which latch means on at least two of said hooks engage said attaching bracket to hold said attaching bracket releasably engaged with said two of said hooks.

* * * * *